United States Patent [19]

Forthmann

[11] Patent Number: 4,743,333
[45] Date of Patent: May 10, 1988

[54] SPLICING DEVICE FOR HEAT SEALABLE MATERIAL

[76] Inventor: Frederick Forthmann, 688 Pascack Rd., Washington Township, N.J. 07675

[21] Appl. No.: 892,331

[22] Filed: Jul. 31, 1986

[51] Int. Cl.$^4$ .............. B32B 31/20; B32B 31/26; B32B 31/18
[52] U.S. Cl. .................... 156/359; 156/366; 156/502; 156/515; 156/518; 156/530; 156/581; 156/583.1
[58] Field of Search ............... 156/502, 515, 518, 530, 156/581, 583.1, 155, 157, 253, 261, 290, 308.4, 358, 359, 366

[56] References Cited

U.S. PATENT DOCUMENTS

| | | | |
|---|---|---|---|
| 3,013,930 | 12/1961 | Serbin | 156/581 |
| 3,097,124 | 7/1963 | Denenberg | 156/253 |
| 3,258,385 | 6/1966 | Lake | 156/290 |
| 3,788,933 | 1/1974 | Nakazawa | 156/253 |
| 4,001,075 | 1/1977 | Menzner | 156/581 |
| 4,240,865 | 12/1980 | Kyts | 156/581 |

Primary Examiner—Donald E. Czaja
Assistant Examiner—J. Davis
Attorney, Agent, or Firm—McGlew and Tuttle

[57] ABSTRACT

A device for connecting two layers of heat meltable material together comprises a toothed member which can be heated and pressed against a ribbed member with the layers of material therebetween. The toothed member includes three rows of teeth with gaps between adjacent teeth. Each row is separated by a gap thickness and the teeth have preferred widths, thicknesses and lengths. The ribbed member has a pair of ribs that defines three grooves for receiving the three rows of teeth. Clearance is provided between the teeth and ribs while the teeth are bevelled to produce perforations in the heat meltable layers while firmly sealing the layers together around a periphery of each perforation.

6 Claims, 3 Drawing Sheets

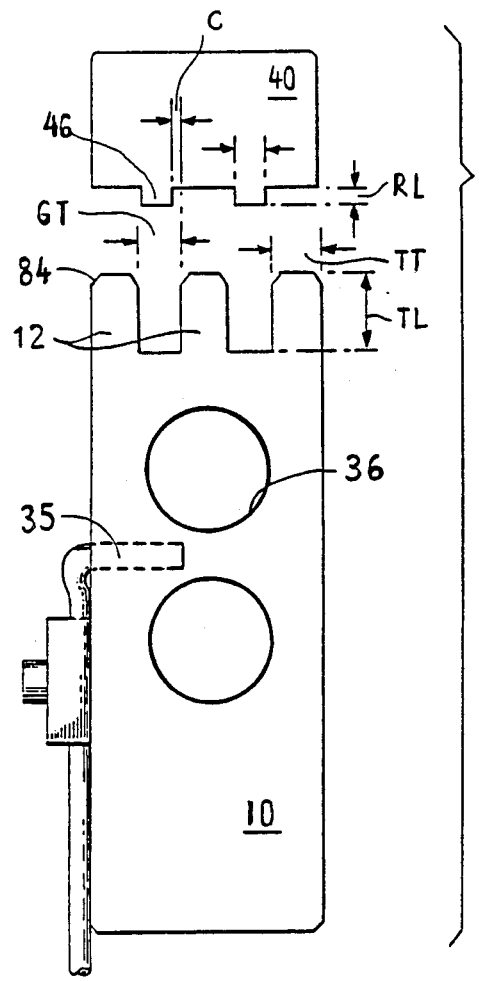
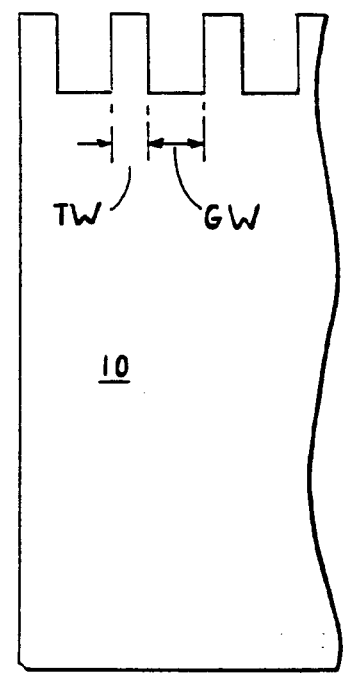
FIG. 4
FIG. 5
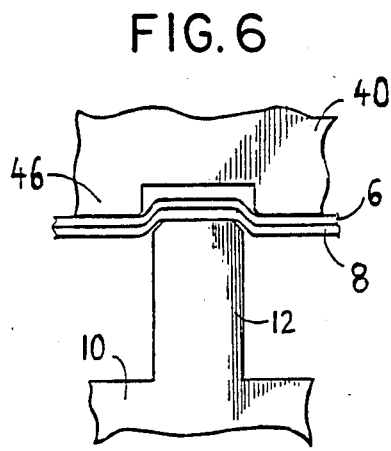
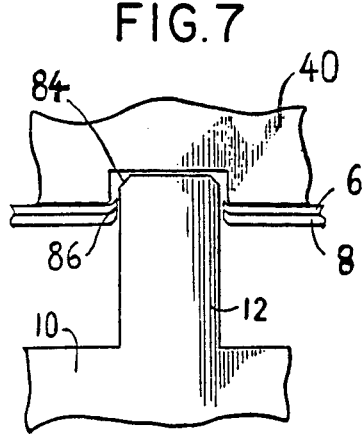
FIG. 6
FIG. 7

SPLICING DEVICE FOR HEAT SEALABLE MATERIAL

FIELD AND BACKGROUND OF THE INVENTION

The present invention relates in general to devices for connecting heat meltable materials, and in particular to a new and useful device for connecting strips of heat meltable material together or for connecting one piece of heat meltable material to another piece of heat meltable material.

Labels, such as those appearing in clothing or similar articles, are generally manufactured of thermoplastic threads such as polyester threads and the like. The labels may also be made out of a non-woven or continuous sheet of heat meltable material.

Such labels may be sewn or heat sealed to clothing.

The labels are manufactured in the form of a continuous strip from which the individual labels are cut. The strips are wound into reels and fed into a label cutting machine by use of the reels. When the end of a strip is reached, a strip from a new reel must be connected to the strip in the cutting machine to ensure continuous operation. This relatively simple requirement has long posed difficulties in this field.

In an effort to connect the end of one strip to the beginning of the next, sewing and stapling operations have been used. When using a sewing operation, a separate sewing machine is necessary. Use of staples also poses problems in that staples may damage the cutting machine and cause problems in feeding the label strips.

The most advantageous way to connect label strips of heat meltable material is to heat-seal them together. The seam formed by the heat sealing operation must be strong and the equipment for forming the seal must be adaptable to different thicknesses for the label strips. To date no satisfactory device exists for achieving this purpose.

Devices are known for heat sealing layers of heat meltable material together. U.S. Pat. No. 4,264,395 to Tota et al shows a device having pins which can be heated and pressed against the flat plate to heat seal two layers of heat meltable material together.

U.S. Pat. No. 4,094,723 to Jones discloses a film splicer which uses heat and pressure to seal strips of film together.

U.S. Pat. Nos. 3,379,595 to Bracey, Jr. and 3,033,257 to Weber also show devices for heat sealing thermoplastic materials.

SUMMARY OF THE INVENTION

The present invention concerns a device for sealing strips of heat meltable material together or for sealing one layer of heat meltable material to another.

The device of the invention utilizes at least one, and preferably a plurality of rows of teeth which have particular dimensions and spacing and which are used in conjunction with a ribbed member to heat seal or "hot sew" two layers of heat meltable material together. The material may be a woven or non-woven fabric of thermoplastic material such as polyester, or a continuous sheet of thermoplastic material.

In accordance with the invention, the toothed member is heated and pressed up against the ribbed member with two layers of heat meltable material therebetween. The device of the invention has controls for varying the impulse pressure exerted by the toothed member against the ribbed member, for varying the time during which the toothed member is engaged against the ribbed member, and for varying the temperature of the toothed member. By varying the impulse pressure, time and temperature, a wide variety of heat meltable materials can be heat sealed together.

It has also been found advantageous to bevel or round edges of the teeth and to provide grooves in the ribbed member for accommodating the teeth with clearance. In this way, a self centering action is achieved between the teeth of the toothed member and the grooves and ribs of the ribbed member. In addition, the heat meltable materials are advantageously squeezed, heated and melted together in a plurality of perforations which are formed by the teeth. Each sheet of heat meltable material is sealed to the other around the periphery of each perforation to form an extremely strong connection between the sheets of material.

When used to connect strips of heat meltable material together, the connection between the strips is very strong. The connection is actually stronger than a sewn connection or stapled connection.

Accordingly, an object of the present invention is to provide a device for connecting two layers of heat meltable material to the other which comprises a toothed member having a face with at least one row of teeth that are spaced apart by a gap within the row, each of the teeth having a thickness across the row, a width parallel to the row and a length from the face of the toothed member, a ribbed member having a face with at least one rib, the rib having a length from the face of the ribbed member and a thickness, the rib defining at least one groove for receiving the row of teeth, drive means for driving the toothed member against the ribbed member to move the tow of teeth into the groove, and heating means for heating the toothed member so as to melt the layers of heat meltable material.

A further object of the present invention is to provide selected ranges for the gap width, tooth thickness, width and length, and rib thickness and length, which has been found particularly advantageous in heat sealing two layers of heat meltable material together.

A still further object of the present invention is to make the drive means adjustable for adjusting the pressure and duration of the engagement between the toothed member and the ribbed member and for controlling the temperature of the toothed member through the heating means.

A still further object of the invention is to provide a toothed member with a plurality of rows of teeth, preferably three rows of teeth being used in conjunction with two ribs on the ribbed member so that three grooves are provided on the ribbed member for the three rows of teeth.

A still further object of the invention is to provide a device for connecting two layers of heat meltable material together which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a side elevational view showing the ribbed and toothed members of the present invention;

FIG. 5 is a partial front elevational view of the toothed member;

FIG. 6 is a partial side elevational view on a greatly enlarged scale showing how a tooth of the toothed member engages into a groove of the ribbed member to begin a heat sealing process; and FIG. 7 is a view similar to FIG. 6 showing the position of the tooth and rib near the end of the sealing process.

DESCRIPTION OF THE PREFERRED EMBODIMENT

Figure 1:
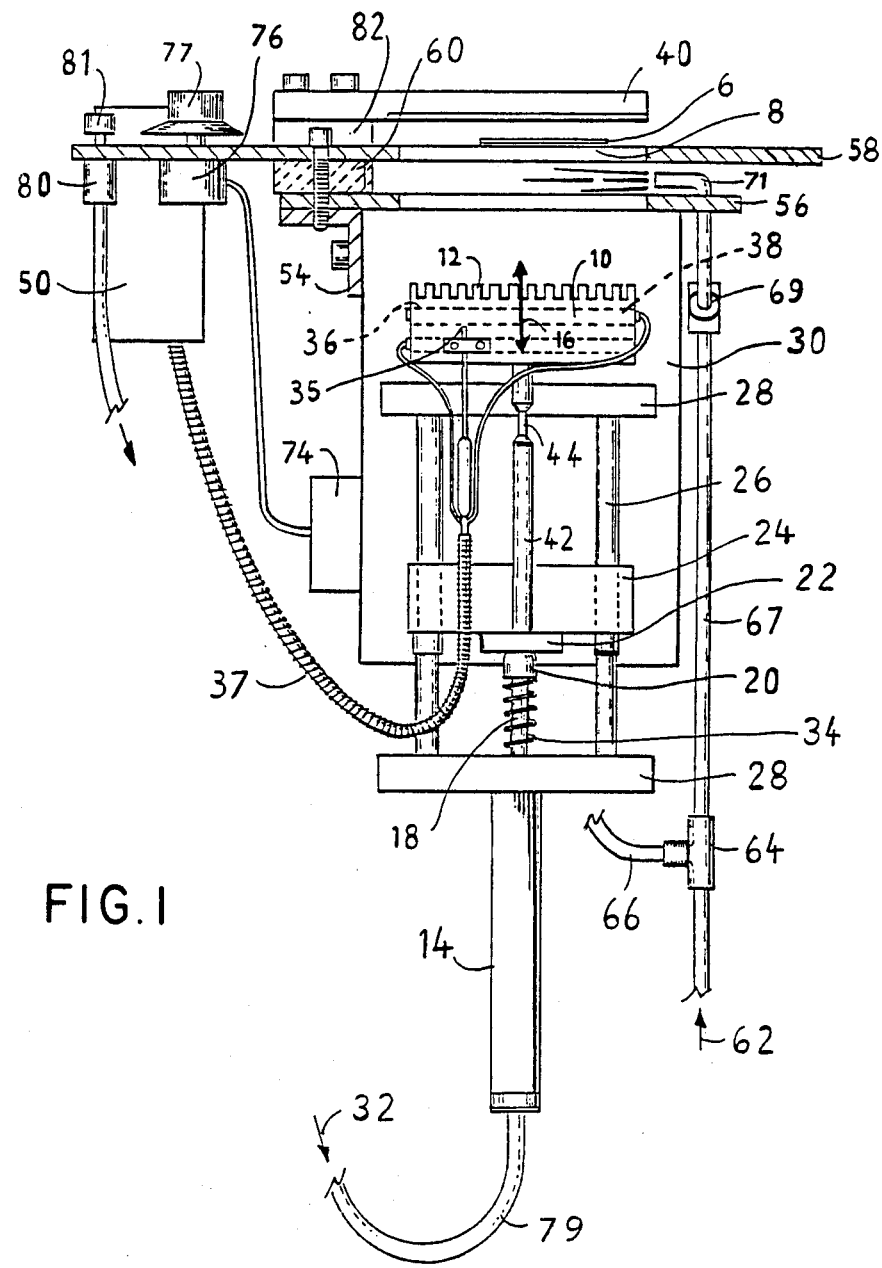
FIG. 1 is a front elevational view of one embodiment of the present invention.

Referring to the drawings in particular the invention embodied in FIG. 1 comprises a device for connecting two layers 6 and 8 of heat meltable material together. The device includes a toothed member 10 which has one or more rows of teeth 12 that extend upwardly from the top face of toothed member 10 and which lie in a row across the face. As shown in FIG. 4, preferably three rows of teeth 12 are provided. As few as one row of teeth and as many as 6 rows of teeth can be used in accordance with the invention. Also, while the rows of teeth are shown as being straight, the rows may be curved or take on any other shape. For the purpose of the present invention, the rows are preferably straight and three rows of teeth are preferably utilized. This has been found to be particularly advantageous in achieving a secure heat sealing between the layers of the multiple material.

As shown in FIG. 1, toothed member 10 is mounted for upward and downward movement in the direction of arrow 16 by drive means which include a cylinder 14 with a piston therein which is connected to a piston rod 18. Piston rod 18 has a cushioned cap 20 which bears against a projection 22 of a slide 24. Slide 24 is mounted for vertical sliding movement on linear bearing rods 26 that are fixed between linearly bearing supports 28.

Figure 3:
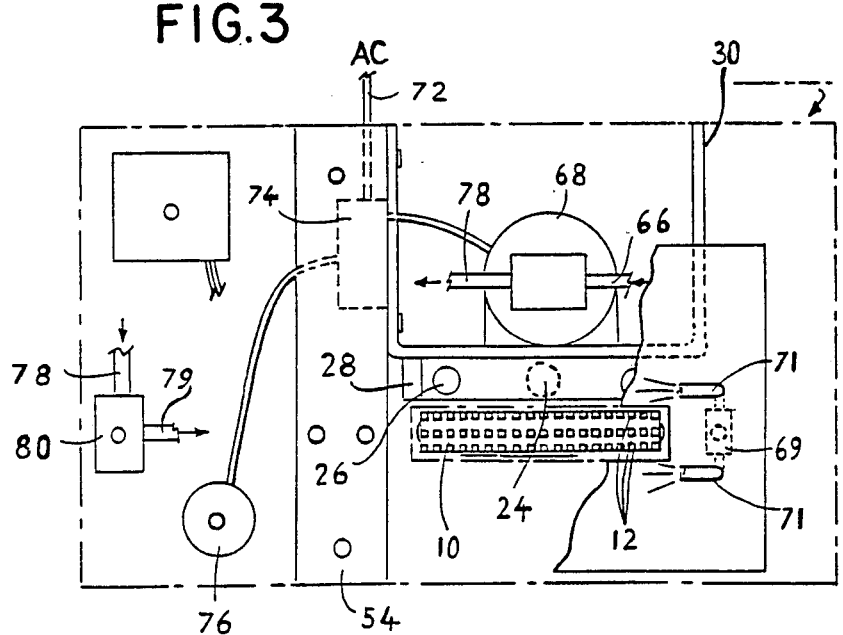
FIG. 3 is a view similar to FIG. 2 with a platform plate removed and other parts broken away for clarity.

The upper bearing support 28 is fixed to a U-shaped channel 30 as also shown in FIG. 3. The lower bearing support 28 is fixed to the lower ends of bearing rods 26 and fixedly carries cylinder 14.

When supplied with air in the direction of arrow 32, cylinder 14 causes piston rod 18 to abruptly move upwardly which in turn causes slide 24 to move upwardly and carry toothed member 10 up against a ribbed member 40.

After a selected time period, air is released from cylinder 14, allowing piston rod 18, slide 24, toothed member 10 to drop to the position shown in FIG. 1. In order to cushion this dropping movement, a spring 34 is engaged around piston rod 18 and bears between the lower bearing support 28 and the cap 20.

Toothed member 10 has a pair of transverse holes 36 which are also shown in FIG. 4 and which each receive a heating element 38 that is connected over wires 37 to a thermostat control 50. A heat sensor 35 extends in a lined bore in the toothed member 10 between the heat element holes 36 to sense the temperature of member 10.

Heat sensor 35 is also connected to thermostat 50. Thermostat 50 is of conventional design and can be set by a dial shown at 52 in FIG. 2, to any desired temperature. It has been found particularly advantageous to provide the heat sensor 35 in a blind bore between the heat elements openings 36 so as to read, as precisely as possible, the actual temperature of heating element 10 and particularly its rows of teeth 12. Positioning the temperature sensor at other locations has proven to be unsatisfactory.

Figure 2:
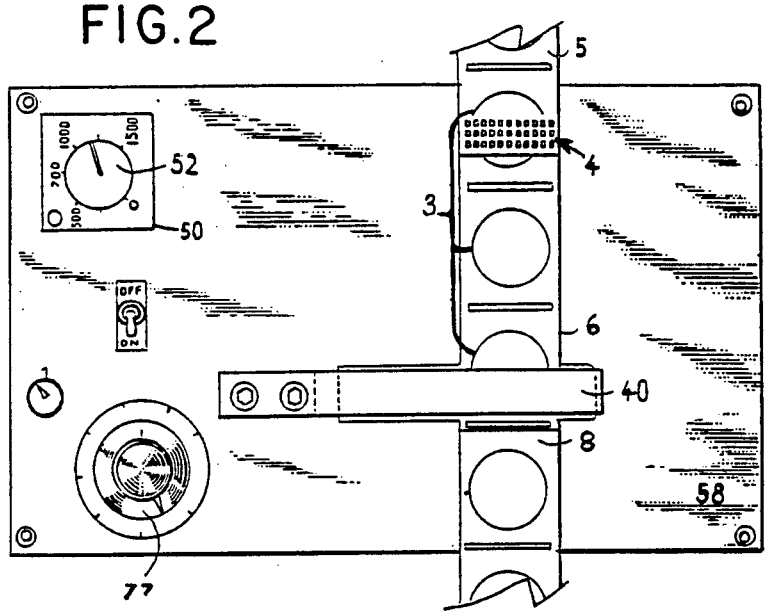
FIG. 2 is a top plan view of the device of FIG. 1.

As shown in FIGS. 1 and 2, a length of angle iron 54 is connected by bolts between the channel 30 and a lower air guiding plate 56. An upper platform plate 58 is spaced from lower plate 56 by a heat insulating strip 60. Plates 56 and 60 each include slots for receiving the toothed member 10 and permitting it to move upwardly into engagement with the ribbed member 40.

Layers of heat meltable material 6, 8 is laid on platform plate 58, as shown in FIG. 2, for effecting a heat seal between layers 6 and 8. A heat seal 4 is shown between a previous layer of heat meltable material 5 and the layer 6. The seal comprises a plurality of rectangular perforations which correspond in shape and distribution to the rows of teeth 12. In FIG. 2, a new heat seal is about to be made between layers 6 and 8. It is noted that the present invention can also be used as a quality control instrument to permit removal of effective labels. If one of the labels shown at 3 in FIG. 2, on the strips of material 5,6 and 8, is found to be defective, it can simply be cut out of the strip. The free ends of the strip can be sealed together using the heat seal 4 and insuring a correct alignment and spacing of the label 3. This quality control process is only possible because of the ease and strength of the heat seal 4. Such a process would not be practical when using a sewing operation or staples.

Turning now to FIGS. 1 and 3, air for cylinder 14 is initially supplied in the direction of arrow 62. A T 64 diverts some of the air to an air hose 66 which is connected to a solenoid valve 68 shown in FIG. 3.

The remaining air is supplied over hose 67 to a T 69 which supplies air to two blow pipes 71. Blow pipes 71 direct air between plates 56 and 58 and on opposite sides of the slots in these plates so as to keep this area cool. This is to keep the platform plate 59 cool for the operator's hands when placing labels in position for joining.

It is also advantageous to utilize air cylinder 14 as the drive means since this device provides a long stroke and permits the heated toothed member 10 to be lowered at a relatively large spacing from the platform 58 to act as an insulating barrier to help keep platform plate cool for operation of the unit. Solenoid valve 68 receives power from an electric power line 72 through a control 74. A timer 76 is also connected to control 74 and has a knob 77 for setting the time period during which toothed member 10 is held up in engagement with ribbed member 40. During that period air continues to flow from hose 66 to an outlet hose 78. Hose 78 is connected to a air flow controller 80 which may, for example be a simple needle valve having a knob 81 for controlling the flow of air from hose 78 to a hose 79 connected at the bottom of cylinder 14.

Knob 81 can be adjusted to control the impulse or pressure which is being exerted by piston rod 18 on toothed member 10.

Thermostat knob 52, timer knob 77 and air flow control knob 81 can thus be adjusted to regulate the parameters of temperature, impulse pressure and duration for toothed member 10. By adjusting all of these parameters to selected levels, a strong heat seal 4 can be established for a wide variety of heat meltable materials.

Toothed member 10 is fixed to projection 22 by a support rod 42. Support rod 42 has a small diameter or weakened portion 44 which permits a small amount of bending of rod 42. This is advantageous in establishing a correct and accurate alignment between the rows of teeth 12 and the grooves in ribbed member 40. This alignment is important as will be explained later.

It is noted that ribbed member 40 is spaced from platform plate 58 by a heat insulator 82 and is secured to the platform by bolts which extend entirely through ribbed member 40, insulator 82, platform plate 58, insulator 60 and lower plate 56. The bolts are threaded into the angle iron 54.

Turning now to FIGS. 4 and 5, each tooth in each row of teeth has a selected length TL from the face of toothed member 10 upwardly. Each tooth also has a selected width TW which is parallel to its row 12 and is spaced from an adjacent tooth in the row by a gap width GW.

Where plural rows are used as shown in FIG. 4, the rows are spaced apart by a gap thickness GT and each tooth in each row has a tooth thickness TT. In the thickness direction, each tooth has a bevelled or rounded edge 84. The sides of the teeth along its length are parallel both in the width direction and the thickness direction.

The ribbed member 40 in FIG. 4 has two ribs 46 which extend from a lower face of the ribbed member 40. Each rib has a rib thickness RT and defines a groove either between the ribs or on either side of the ribs. One groove in ribbed member 40 is provided for each row of teeth 12. The thickness of the grooves and thickness of the ribs is selected so that with the teeth engaged in the grooves a clearance C is established.

The bevelled or curved edges 84 of the teeth has been found advantageous in forming a secure heat seal around the periphery of each perforation made by each tooth in the layers of heat meltable material. As shown in FIG. 6, when a tooth of toothed member 10 first engages layers 6, 8 of material and starts to move into a groove of ribbed member 40, the material is squeezed and heated across the entire groove. In the clearance area of the groove between the rib 46 and the tooth, material is strongly heated and squeezed. As shown in FIG. 7, the heat of the toothed member 10 eventually melts away and actually evaporates the material of layer 6 and 8 which are in the groove of member 40. This leaves a periphery shown at 86 in FIG. 7 where the layers 6 and 8 are securely melted together.

The bevelled or curved edge 84 of the teeth 12 advantageously interacts with the sides of one or both ribs 46 to form the melt together periphery 86. It is noted that the outer rows of teeth 12 only interact with one of the ribs. The best peripheral connection is thus achieved by the central row of teeth in the groove that it bounded by two ribs. The outer rows still contribute substantially to a strong seal.

It is noted that the multiplicity of teeth across the width of toothed member 10 produces a multiplicity of perforations each with its own sealed periphery and thus a very strong connection between the heat multiple strips.

About 30 teeth may be used per row. A greater number of teeth or fewer teeth may be used depending on the overall width of the strips of material to be connected.

The preferred ranges for the various dimensions of the teeth and ribs will be set forth below. Except for the length dimensions, the dimensions of the teeth may vary across the ribbed member. In one advantageous form of the invention, teeth which are close together are provided at one end of the toothed member 10 for sealing particularly thin layers while more widely spaced larger teeth may be used at an opposite end of the toothed member for sealing thicker strips.

The present invention can be used for sealing strips of material that have an individual thickness of from about 0.005 to 0.040 inches. This represents the range between very thin flexible heat meltable strips to very thick rigid strips. The strips may be made for example, of nylon or polyester or any other heat meltable material.

The following ranges are particularly advantageous in treating this type of material:

GW (gap width)—0.125 to 0.015 in.
TW (tooth width)—0.060 to 0.015 in.
TT (tooth thickness)—0.125 to 0.015 in.
TL (tooth length)—$\frac{1}{4}''$ to 1/16''
GT (gap thickness)—0.150 to 0.032
RL (rib length)—0.010 to 0.062
C (clearing groove to tooth)—0.010 to 0.060

The clearance C is preferably between 0.025 to 0.030 in. and is selected to be about twice the fabric thickness for heat meltable material to be sealed together.

The foregoing ranges for the various dimensions in the toothed and ribbed members, has been discovered after a lengthy period of experimentation where different configurations and dimensions were used. In an original approach, the member 40 are provided without ribs and simply presented a flat surface to the toothed member 10. This was found to produce unsatisfactory connections between strips of material. A later approach utilized a complex member 40 having negative teeth for each of the teeth of tooth member 10. This also was found satisfactory in overheating, burning and undesirably melting the layers to be connected.

It was also found that if the teeth of the toothed member 10 were made too large or too long, they tended to push the layers of heat meltable material into the groove and cause unsatisfactory connections. If the teeth were made too short, not enough bonding was found in the periphery 86 around each perforation.

While a specific embodiment of the invention has been shown and described in detail to illustrate the application of the principles of the invention, it will be understood that the invention may be embodied otherwise without departing from such principles.

What is claimed is:

1. A device for connecting two layers of heat meltable material together, comprising:
    a toothed member having a face with at least one row of teeth that are spaced apart by a gap width in said row, each of said teeth having a thickness across said row, a width parallel to said row and a length from said face of said toothed member;
    a ribbed member having a face with at least one rib, said rib having a length from said face and a thickness, said rib defining at least one groove for receiving said at least one row of teeth; drive means for driving said toothed member and said ribbed member together and for closing each said row of teeth to engage in a respective groove; and heating means connected to said toothed member for heating said toothed member sufficiently to melt the heat meltable material, said rib and tooth thickness being selected to establish a clearance between said rib and said row of teeth when said toothed and ribbed members are moved against each other the edges of said teeth in said thickness dimension of said teeth are bevelled, said toothed member including three rows of teeth separated from each other by a gap each with a gap thickness, said ribbed member having a pair of ribs defining a central groove therebetween for a central one of said rows of teeth and an outer groove on a side of each rib opposite from said central groove for receiving outer ones of said rows of teeth, each rib having a rib thickness selected to establish clearances between said ribs and said teeth with said toothed and ribbed members engaged against each other.

2. A device according to claim 1, wherein said teeth have edges that are bevelled in their width dimension, said gap width being from 0.125 to 0.015 inches, said tooth width being from 0.060 to 0.015 inches and said tooth thickness being from 0.125 to 0.015 inches, said tooth length being from ¼ inch to 1/16th inch.

3. A device according to claim 2, wherein said rib length is from 0.010 to 0.062 and said groove has a thickness which is selected to establish a clearance of from 0.010 to 0.060 between said rib and said row of teeth with said toothed and ribbed members engaged against each other.

4. A device according to claim 3, wherein said clearance is from 0.025 to 0.030.

5. A device for connecting two layers of heat meltable material together, comprising:
a toothed member having a face with at least one row of teeth that are spaced apart by a gap width in said row, each of said teeth having a thickness across said row, a width parallel to said row and a length from said face to said toothed member;
a ribbed member having a face with at least one rib, said rib having a length from said face and a thickness, said rib defining at least one groove for receiving said at least one row of teeth; drive means for driving said toothed member and said ribbed member together and for closing each said row of teeth to engage in a respective groove; and
heating means connected to said toothed member for heating said toothed member sufficiently to melt the heat meltable material, said drive means including timing means for establishing a time during which said toothed members held against said ribbed member, said heating means including a temperature sensor connected to said toothed member and a thermostatic control for controlling temperature of said toothed member, said drive means comprising a bearing for sliding movement of said toothed member toward and away from said ribbed member, a piston and cylinder combination operatively engaged to said bearing for moving said toothed member against said ribbed member and flow control means for regulating a flow of fluid to said piston and cylinder combination for adjusting an impulse pressure of said toothed member against ribbed member.

6. A device according to claim 5, wherein said toothed member has a plurality of rows of teeth with a gap thickness between said rows of teeth, said gap thickness being from 0.150 to 0.032 inches, said tooth width being from 0.060 to 0.015 inches, said tooth thickness being from 0.125 to 0.015 inches, said tooth length being from ¼ inch to 1/16th of an inch, said gap width being from 0.125 to 0.015 inches, said ribbed member having a plurality of ribs spaced apart and extending parallel to said rows of teeth, each rib having a length of from 0.010 to 0.062 and defining a clearance with said teeth when said toothed and ribbed members are engaged together of 0.010 to 0.060.

* * * * *